(12) United States Patent
Hamel et al.

(10) Patent No.: US 7,418,441 B2
(45) Date of Patent: Aug. 26, 2008

(54) DATA LOADING FROM A REMOTE DATA SOURCE RECORD BY RECORD

(75) Inventors: Elizabeth Belva Hamel, Morgan Hill, CA (US); Michael T. Ho, Willowdale (CA); James C. Kleewein, San Jose, CA (US); Mark Donald Leitch, Ajax (CA); Sam Sampson Lightstone, Toronto (CA); John Ai McPherson, Jr., San Jose, CA (US); James Alan Ruddy, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 1851 days.

(21) Appl. No.: 09/912,586

(22) Filed: Jul. 24, 2001

(65) Prior Publication Data

US 2002/0161748 A1  Oct. 31, 2002

Related U.S. Application Data

(60) Provisional application No. 60/272,680, filed on Feb. 28, 2001.

(51) Int. Cl.
*G06F 17/30* (2006.01)
(52) U.S. Cl. ............... 707/3; 707/4; 707/5; 707/10; 707/100; 709/200; 709/201; 709/203
(58) Field of Classification Search .................. 707/2, 707/3, 4, 5, 10, 100; 709/200, 201, 202, 709/203
See application file for complete search history.

(56) References Cited

U.S. PATENT DOCUMENTS 5,410,693 A   4/1995   Yu et al. .................. 707/100

(Continued)

FOREIGN PATENT DOCUMENTS

EP         0589219 A2   3/1994

(Continued)

OTHER PUBLICATIONS

IBM, "Datajoiner: A multidatabase Server Version 1", White paper Data Management Solutions, IBM Corporation 1995, 28 pages.*

(Continued)

*Primary Examiner*—Khanh B Pham
(74) *Attorney, Agent, or Firm*—Kunzler & McKenzie

(57) ABSTRACT

A method, apparatus and article of manufacture is provided for loading data from a remote data source record by record, in a computer system network connecting a source site and a target site via a database connection communication line. The source site has at least one data source and a Distributed Relational Database Architecture (DRDA) software server having multi-database access to DBMSs. The target site requests data loading from the source site DRDA via a block of Structured Query Language (SQL) statements. Data are transported record by record via the database connection communication line according to the DRDA communication protocol, wherein the target site loads records concurrently with the unloading of records in the source site. The data loading may also be performed in a pipeline manner, loading data records in multiple partitions with a plurality of parallel streams, pointed to by a plurality of data source partition cursors.

24 Claims, 2 Drawing Sheets

U.S. PATENT DOCUMENTS

| | | | | |
|---|---|---|---|---|
| 5,511,186 | A | * | 4/1996 | Carhart et al. .................. 707/2 |
| 5,884,327 | A | | 3/1999 | Cotner et al. ................ 707/202 |
| 5,987,465 | A | * | 11/1999 | Kleewein et al. .............. 707/10 |
| 5,987,472 | A | * | 11/1999 | Serafin .................... 707/104.1 |
| 6,006,229 | A | | 12/1999 | Schmidt et al. ............... 707/10 |
| 6,044,216 | A | * | 3/2000 | Bhargava et al. ............ 717/114 |
| 6,151,602 | A | * | 11/2000 | Hejlsberg et al. ............. 707/10 |
| 2002/0038313 | A1 | * | 3/2002 | Klein et al. ................. 707/200 |
| 2003/0037048 | A1 | * | 2/2003 | Kabra et al. .................... 707/4 |

FOREIGN PATENT DOCUMENTS

EP 0795834 A1 9/1997

OTHER PUBLICATIONS

Vassilakis et al., "Implementing Embedded Valid Time Query Languages", Proceedings of the DEXA '98 Conference, 1998, pp. 561-572.*

Gottenukkala et al., "Interfacing parallel Applications and Parallel Databases", IBM T. J. Watson Research Center, 1997, pp. 355-364.*

Mullins C., "DB2 Developer's Guide, Fourth Edition", Sams Publishing, May 11, 2000, Chapter 9.*

Michael Gertz, *Oracle/SQL Tutorial*, http//www.db.cs.ucdavis.edu, Version 1.01, Jan. 2000.

Chamberlin et al, *Complete guide to DB2 Universal Database*, Complete Guide to DB2 Universal Database, 1998, pp. 589-599.

Gupta P et al, *DataJoiner; A Practical Approach To Multi-Database Access*, Parallel and Distributed Information Systems, 1994. Proceedings of the 3rd Intl Conf on Austin, TX, USA Sep. 28-30, 1994, Los Alamitos, CA, Sep. 8, 1994, p. 264.

Chamberlin et al., *A Complete Guide to DB2 Universal Database*, Complete Guide to DB2 Universal Database, 1998, pp. 162-174, 643-658.

Record Blocking in SQLJRA Remote Protocol, Dec. 1992, IBM Technical Disclosure Bulletin, pp. 290-292.

Distributed Relational Database Architecture Reference, IBM Corp., Second Edition, Mar. 1993, IBM Ref. No. SC26-4651-01.

* cited by examiner

```
                                            .-SYSREC-.
                  .-DATA-.  .-INDDN--'-ddname---'-------.
>>--LOAD--'---------'--+------------------------------+--.---------------------.-------------->
                       '-INCURSOR--cursor-name-'         '-PREFORMAT-'

.-RESUME--NO-.   .-SHRLEVEL--NONE-.
>---'------------'---'----------------'---.-------------------------------------.--sta->
        |                                 '-REPLACE-.---------------.-'
        |                                           '-copy spec-'
        '--RESUME--YES--.---------------------------------.---------------------->
                        |          .-NONE-----.           |
                        '-SHRLEVEL--'-CHANGE-'------'

.-LOG--YES---------------------.
>---.-----------------.---.--------.---------+------------------------------+------>
    '-KEEPDICTIONARY-'   '-REUSE-'           '-LOG--NO--.-----------------.-'
                                                        '-NOCOPYPEND-'

>--.----------------------------------------------------.--.---------------------.----->
   |              .-SYSUT1--. .-,SORTOUT-. |            '-FORMAT-.-UNLOAD-.--'
   '-WORKDDN(-'-ddname1--'--+---------------+-)-'                '---SQL/DS--'
                            '-,ddname2--'

.-FLOAT(S390)-.  .-EBCDIC--.
>--.---------------------- --+-------------+--+---------+-----+--------------------->
   |          .-0--------.   '-FLOAT(IEEE)-'  |-ASCII------|
   '--SORTKEYS--+----------+--'                '-UNICODE-'
              '-integer-'

>---.------------------------.--.---------.--.-----------------------------.--------->
    |       <-,-----<        |  '-NOSUBS-'  |        .-CONSTRAINTS-.       |
    '-CCSID(--integer--)-'                  '-ENFORCE-'-NO-----------------'-'

>---.--------------------------.--.-------------------------.----------->
    |        .-SYSERR-. |      |             .-SYSMAP-. |
    '-ERRDDN-'-ddname--'--'    '-MAPDDN-'-ddname---'-'

>---.------------------------------.--.-----------------------------.----->
    |         .-SYSDISC-. |        |              .-0--------. |
    '-DISCARDDN-'-ddname----'--'     '-DISCARDS-'-integer-'--'

>---.----------------------------------------------.--------------------->
    '-SORTDEVT--device-type-' '-SORTNUM--integer--'

>---.---------------------------------------------------------------.----->
    '-CONTINUEIF(start-.--------.-)=-.-X'byte-string'-----.--'
                       '-:end-'      '-'character-string'-'

<----------------------<

>----into table spec------------------------------------------------------->
```

FIG. 2

DATA LOADING FROM A REMOTE DATA SOURCE RECORD BY RECORD

RELATED APPLICATION

This application claims the benefit of U.S. provisional patent application entitled "Data Loading From a Remote Data Source" by the same inventors, Ser. No. 60/272,680, filed on Feb. 28, 2001, assigned to the same assignee.

BACKGROUND OF THE INVENTION

1. Field of the Invention

The present invention generally relates to database management systems, and, more particularly, to mechanisms within computer-based database management systems for unloading, transferring and loading persistent data residing in one data source into a remote data source, without being limited by physical constraints of the file transfer system at either the source or the target.

2. Description of Related Art

The increasing popularity of electronic commerce has prompted many companies to turn to application servers to deploy and manage their applications effectively. Quite commonly, these application servers are configured to interface with a database management system (DBMS) for storage and retrieval of data. This often means that new applications must work with distributed data environments. As a result, application developers frequently find that they have little or no control over which DBMS product is to be used to support their applications or how the database is to be designed. In many cases, developers find out that data critical to their application is spread across multiple DBMSs developed by different software vendors.

Often, it is desirable to unload/extract/export data from one data source, transport it to the target site, and load/import the data into the target site data repository, without being limited by physical constraints of the file transfer system, at either the source or the target site. It is also desirable that the loading of target records can be accomplished concurrently with the unloading of source records. This can be accomplished if data are transported record by record, so that operations of sending one record and receiving another record are happening concurrently on a source and target site.

Presently, however, there is no such capability. Data are unloaded into a file, the whole file is transported, and then data is loaded into a target. Transporting the data within files is conventionally performed using a file transfer procedure (FTP). Unfortunately, companies using FTP for DBMS applications may encounter some stumbling blocks. Often, there is a concern that source site and target site file formats may not be compatible. Moreover, the quantity of data to be transferred may exceed the maximum target site operating system file size. Furthermore, if design requirements call for a transfer of record data from database tables whose attributes must span multiple DBMSs, this is not currently supported, because presently record data may not be joined together from multiple data sources, while being transferred. Moreover, it is desirable to use different database products supported by a variety of leading information technology vendors, because they offer many potential business benefits, such as increased portability and high degrees of code reuse. Unfortunately, current DBMS vendors do not support data transfer in record by record mode, or joining of data from multiple data sources, while the records of data are being transferred.

Thus, the developer is forced to turn to more complex (and potentially cumbersome) alternatives to gain access to needed data records. Often, the alternatives are more costly and time-consuming to implement, require a more sophisticated set of programming skills to implement DBMS technology, may consume additional machine resources to execute, may increase labor requirements for development and testing, and potentially inhibits portability of the data itself One presently available solution to this problem, when an application developer needs to build an application that accesses and transfers critical data present in multiple data sources, involves manually simulating transparent access. In that case, a programmer takes on the burden of writing the software to individually connect to each of the necessary data sources, read in any necessary data, correlate (or join) the results read in from multiple data sources, perform any necessary data translations, etc. This is a substantial amount of work and is well beyond the skill level of many programmers. Furthermore, it incurs a great deal of cost. In addition, it requires considerable knowledge of the application programming interfaces (APIs) of each data source involved, and affords less opportunity for query optimization, which may inhibit performance.

Another presently available solution to the problem calls for a physical consolidation of the data, where the data from different data sources have to be copied into a single data source, which a programmer will then transfer. However, this raises issues involving data latency and added cost. Due to the data latency, copies of data will be slightly to significantly "older" than data contained in the original data sources. Working with out-of-date (and potentially inaccurate) data can be unacceptable to many applications. Increased costs include software costs, since additional software must be purchased, installed, configured, and maintained to copy data from one source to another on a scheduled or periodic basis, as well as the labor costs involved with it. The software must support data migration effort or implement a data replication process that supports very low data latency.

Therefore, there is a need to provide a method and a system which can transfer persistent data, often residing in multiple data sources and possibly stored in different formats, to a target site depository, record by record. This would simplify the design, development, and maintenance of applications and provide more reliable applications with a function that would otherwise be inaccessible.

SUMMARY OF THE INVENTION

The foregoing and other objects, features, and advantages of the present invention will be apparent from the following detailed description of the preferred embodiments which makes reference to several drawing figures.

One preferred embodiment of the present invention is a method for loading data from a remote data source record by record, in a computer system network connecting a source site and a target site via a database connection communication line. The source site has at least one data source and a software server having multi-database access to DBMSs. The target site requests data loading from the source site via a block of Structured Query Language (SQL) statements or their equivalent. Data are transported record by record via the database connection communication line according to a multi-database access communication protocol, wherein the target site loads records concurrently with the unloading of records in the source site. The data loading may also be performed in a pipeline manner, loading data records in multiple partitions with a plurality of parallel streams, pointed to by a plurality of data source partition cursors. The software server having multi-database access to DBMSs preferably uses a Distributed Relational Database Architecture (DRDA), and the database connection communication line preferably utilizes the TCP/IP protocol.

Another preferred embodiment of the present invention is an apparatus implementing the above-mentioned method embodiment of the present invention.

Yet another preferred embodiment of the present invention is a program storage device readable by a computer tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout:

FIG. 2 illustrates the syntax form of several options of the LOAD command, according to the preferred embodiments of the present invention.

DETAILED DESCRIPTION OF THE PREFERRED EMBODIMENTS

Figure 1:
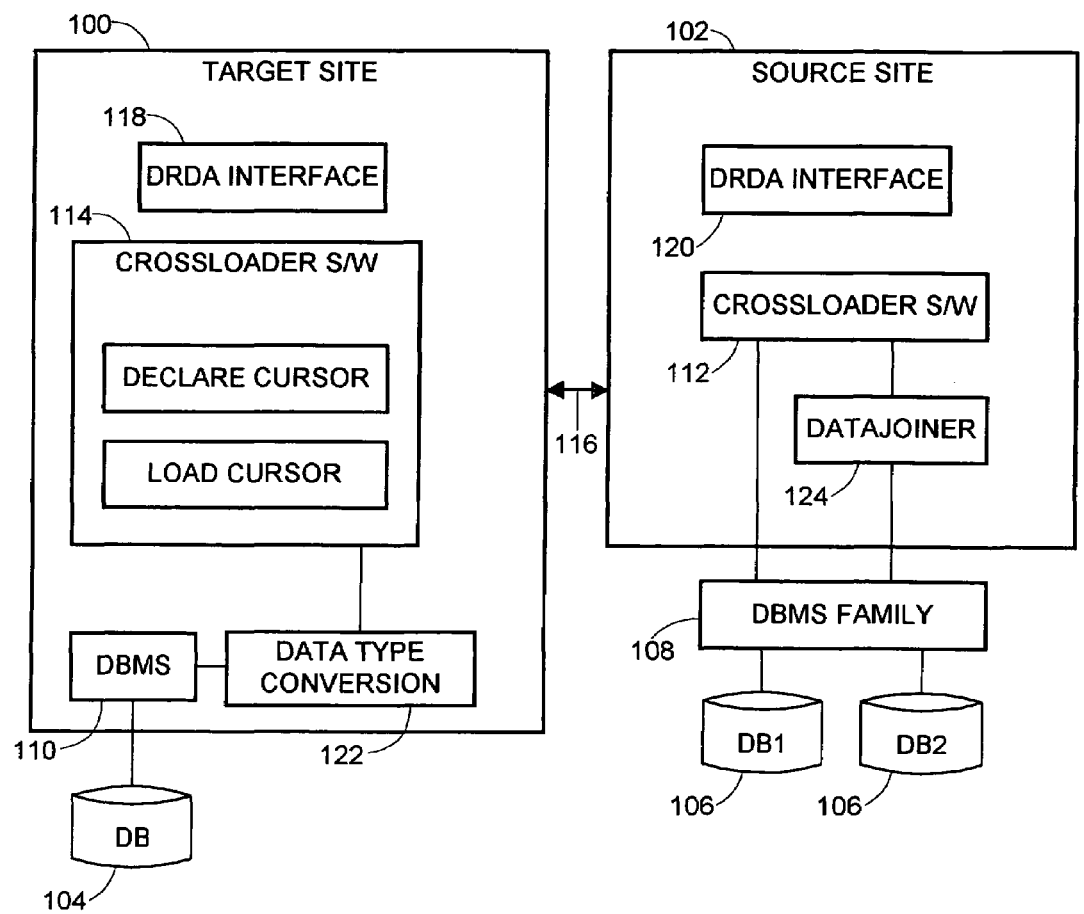
FIG. 1 illustrates a block diagram of an exemplary computer hardware and software environment, according to the preferred embodiments of the present invention.

In the following description of the preferred embodiments reference is made to the accompanying drawings which form the part thereof, and in which are shown by way of illustration specific embodiments in which the invention may be practiced. It is to be understood that other embodiments may be utilized, and structural and functional changes may be made without departing from the scope of the present invention.

The present invention is directed to a system, method and program storage device embodying a program of instructions executable by a computer to perform the method of the present invention for transferring persistent data that often reside in multiple data sources and are possibly stored in different formats, into a target site depository, record by record. Transfer of data from multiple data sources, possibly stored in different formats, is accomplished using existing conventional technology called a multi-database software server. Thus, developers can transfer data record by record, and record attributes may span multiple data sources. Furthermore, they can access any or all of these attributes within a single transaction. Since the present invention may be supported by a variety of leading information technology vendors, this offers many potential business benefits, such as increased portability and high degrees of code reuse, without placing any programming burden on application developers.

The preferred embodiments of the present invention preferably use for access to data sources a software server having multi-database access to DBMSs, such as a Distributed Relational Database Architecture (DRDA) software server, which can be accessed from the target site using the Structured Query Language (SQL) commands or their equivalent. Data are preferably formatted and transported according to the DRDA communication protocol rules, record by record, and loaded directly into the target site. The invention preferably uses standard SQL commands, which may be complex SQL commands. It allows use of union and join function, used to join together data from multiple data sources.

With the embodiments of the present invention, a data record can be transported as soon as one or more data records are unloaded from a source site, and data loading at a target site can begin as soon as a record was transported to the target site. Thus, the target site can be loading records concurrently with the unloading of records in the source site. Further, since all the data to be transferred do not have to be completely loaded into a file before the transfer, the quantity of data may be unlimited, and is not bound by the maximum file transfer system size. Moreover, using the DRDA or similar communication protocol provides a neutral data format, and there is no concern whether loading and unloading site file formats are compatible.

The software preferred embodiment of the present invention is implemented in the utilities package of DB2 for OS/390 Version 7 and z/OS, as a utility enhancement referred to as Load From a Cursor, or the DB2 Family Crossloader. The present invention allows a user on a target site to request records from a source site to be transferred to the target site. This is preferably accomplished with a SQL DECLARE CURSOR FOR SELECT statement, which references the SELECT command result rows of a source site table by a cursor name. This command is sent to the source site to be executed. Next, the user on the target site utilizes a LOAD command, which specifies a target site table. The LOAD command utilizes a new operator INCURSOR, defined for the present invention, which uses the same cursor name as used in the SELECT statement, to indicate the location of the data which will be loaded into the target site table. Thus, the present invention uses a cursor name instead of a file name, presently defined with INDDN, to reference each record of data separately, instead of referencing the whole file.

FIG. 1 illustrates a block diagram of an exemplary computer hardware and software environment according to the preferred embodiments of the present invention, including a target site 100 and a source site 102, each having one or more conventional processors (not shown) executing instructions stored in an associated computer memory (not shown). The operating memory can be loaded with instructions received through an optional storage drive or through an interface with the network. The preferred embodiments of the present invention are especially advantageous when used in a network environment, having a console terminal (not shown) on the target site 100, and the target site 100 processor networked to the source site 102 processor via a database connection communication line 116, which is preferably being the TCP/IP communication line, over which the records are transported according to DRDA communication protocol rules.

The source site 102 processor is connected to one or more electronic storage devices 106, such as disk drives, that store one or more relational databases. Storage devices 104 are also used on the target site 100. They may comprise, for example, optical disk drives, magnetic tapes and/or semiconductor memory. Each storage device permits receipt of a program storage device, such as a magnetic media diskette, magnetic tape, optical disk, semiconductor memory and other machine-readable storage device, and allows for method program steps recorded on the program storage device to be read and transferred into the computer memory. The recorded program instructions may include the code for the method embodiments of the present invention. Alternatively, the program steps can be received into the operating memory from a computer over the network.

Operators of the console terminal at the target site 100 use a standard operator terminal interface (not shown), such as IMS/DB/DC, CICS, TSO, OS/2 or other similar interface, to transmit electrical signals to and from the target site 100, that represent commands for performing various tasks at the source site 102, such as search and retrieval functions or termed queries, against the databases stored on the electronic storage devices 106. In the present invention, these queries preferably conform to the SQL standard, and invoke functions performed by a DataBase Management System (DBMS) located at the source site 102, which may be a part of a DBMS family 108, which is preferably a Relational DataBase Management System (RDBMS) software. There is also a DBMS 110 at the target site 100. In the preferred embodiments of the present invention, the RDBMS software is the DB2 product, offered by IBM for the AS400, OS390 or OS/2 operating systems, the Microsoft Windows operating systems, or any of the UNIX-based operating systems supported by the DB2. Those skilled in the art will recognize, however, that the present invention has application to any RDBMS software that uses SQL, and may similarly be applied to non-SQL queries.

FIG. 1 further illustrates a software environment enabling preferred embodiments of the present invention. In the system shown in FIG. 1, the target site 100 further includes a crossloader software 114 of the present invention, capable of communicating with a crossloader software 112 located at the source site 102 via the database connection communication line 116. Each crossloader software 112, 114 includes a block of instructions useable to perform the record by record data transfer of the present invention, as shown below. The target site 100 also includes a DRDA interface 118 and the source site 102 further includes a DRDA interface 120. The crossloader software 114 is also connected with the DBMS 110, and the crossloader software 112 is connected to the DBMS family 108, to allow access to the database items. Moreover, the target site 100 also includes a data type conversion module 122, useable for data type conversion supported by the DRDA protocol, when needed. The source site 102 further includes a multi-database software server 124, such as a DataJoiner module shown in FIG. 1, used to migrate data from different DBMSs (such as Oracle to DB2), which is connected to the crossloader software 112 and the DBMS family 108.

The method embodiment of the present invention includes the following steps. Firstly, a user identifies data to be transferred, which may be at different data source sites, and stored in different formats. For example, s/he may identify that certain records from tables of the DBMS family 108, residing in a DB2, Oracle, Sysbase, Informix, IMS, or VSAM database, SQL Server or NCR Teradata, are relevant to his/her application and should be migrated. The exact nature of steps involved in data sources identification can vary. The preferred embodiment of the present invention is implemented issuing SQL commands, but numerous other possibilities can be employed.

If using data from distributed data sources, in the next step a user employs a software facility to connect to the data sources from the DBMS family 108 containing the data, and registers these data objects with the software facility. This software facility has capabilities of a multi-database software server, shown in FIG. 1 as the DataJoiner 124, sometimes called a federated DBMS, which has access to multiple data sources, each of which may reside on different systems and may store data in different formats. The preferred embodiments of the present invention were implemented using the IBM's DB2 DataJoiner multi-database software server 124, such as DataJoiner V2.1 for DB2 V6.1, to connect with the DBMS family 108 including Oracle DBMS, Sybase DBMS, Informix DBMS, etc.

Afterwards, using this software facility, i.e., the multi-database software server, the user creates a command that consolidates multiple attributes from previously registered data from data sources. One implementation of this step may involve the crossloader software 114 using a SQL SELECT statement accessing a relational DBMS table or view, where such view joins data from different, sometimes remote, data sources (such as tables), based on the specific needs of the application. Each such SELECT statement filters data as appropriate, electing sometimes to limit the resulting record or view to a subset of the rows and columns associated with one or more data sources (tables). For the SELECT statement, the user must declare a cursor. This may allow standard database connectivity mechanism to connect to the software facility, i.e., the multi-database software server, in order to reference the data record by record, as though the data were derived from a single table.

Next, in the crossloader software 114 of the target site 100, a standard SQL command, such as a LOAD command, can be used to establish a connection to the previously declared cursor, in order to load data represented by the view previously defined. Once the steps outlined above are completed, programmers can gain access to data, in a manner that hides the distributed nature of the data they need to access. This facilitates efficient development of many useful business applications, thus minimizing development and maintenance costs. With the present invention the users can migrate an application from one member of the DB2 family to another. The table may be larger than the file size handled by the server operating system.

Since the present invention uses standard SQL, it can use three part names to identify the source data by data location, schema name and table name, as required for distributed access. Alternative embodiments use a CONNECT statement to connect the source site 102 to the target site 100. The present invention preferably uses the dynamic SQL statements to build utility blocks of SQL statements. The EXEC SQL utility command is used for cursor declaration. Some other SQL statements which can be dynamically executed may also be defined in the same EXEC SQL command.

The following syntax diagram shows the format of the EXEC SQL command, where the "declare cursor spec" command may be followed by a "non-select dynamic SQL statement", in the same block:

```
>>--EXEC--SQL--.-declare cursor spec--------------.--
     ENDEXEC-------------->
```

'-non-select dynamic SQL statement-'

The phrase "declare cursor spec" is entered as the DECLARE CURSOR statement, to define a cursor pointing to the result of the SELECT statement. It has the following SQL format:

```
>>--DECLARE--cursor-name--CURSOR--FOR--
     select-statement--ENDEXEC---------->
```

The phrase "cursor-name" identifies a cursor. The "select-statement" specifies the SQL SELECT command, used to provide result rows from the table, to be pointed to by the cursor declared in the cursor declaration statement.

The phrase "non-select dynamic SQL statement" points to a command used to perform the specified SQL statement in the EXECUTE IMMEDIATE mode. The "non-select dynamic SQL statement" may be one of the following SQL statements:

| | |
|---|---|
| ALTER | RENAME |
| COMMENT ON | REVOKE |
| COMMIT | ROLLBACK |
| CREATE | SET CURRENT DEGREE |
| DELETE | SET CURRENT LOCALE LC_CTYPE |

-continued

| | |
|---|---|
| DROP | UPDATE |
| EXPLAIN | SET CURRENT OPTIMIZATION HINT |
| GRANT | SET CURRENT PATH |
| INSERT | SET CURRENT SQLID |
| LABEL ON | SET CURRENT PRECI SION |
| LOCK TABLE | SET CURRENT RULES |

While the SQL statement is being executed, the specified statement string is parsed and checked for errors. If the SQL statement is invalid, it is not executed, and the error condition that prevents its execution is reported. If the SQL statement is valid, but an error occurs during its execution, that error condition is reported. DB2 can stop the execution of the SQL statement, if the statement is taking too much processor time to finish. When this happens, an error occurs and is reported. Whenever an error occurs, the utility terminates.

An example of a valid DECLARE CURSOR statement, used to declare a cursor to select all the rows and columns from a sample table MYSOURCE, is given below:

EXEC SQL
   DECLARE C1 CURSOR FOR SELECT*FROM MYSOURCE
ENDEXEC

The LOAD command may have many options. FIG. 2 illustrates the syntax form of several options of the LOAD command, according to the preferred embodiments of the present invention.

Use of the "INCURSOR cursor-name" parameter in the LOAD command is the preferred embodiment of the present invention. The LOAD command specifies the same cursor pointing to the source site data to be unloaded. Thus, the cursor must have already been declared in the "declare cursor for select" statement. The names of the columns in the SELECT statement table must be identical to the names of the columns in the target table to receive the loaded records. However, the "AS" clause in the select list can be used to change the names of the columns returned by the SELECT statement.

Following are two examples showing the implementation of the preferred embodiments of the present invention.

EXAMPLE 1

This example declares the cursor C1 and loads into a target table the records from a source site table, obtained as results of the SELECT statement which declares the cursor C1. LOAD command is modified to accept an INCURSOR parameter for the record by record transfer mode, which is used instead of an INDDN parameter used for a conventional whole file transfer.

EXEC SQL
   CREATE TABLE MYTARGET LIKE MYSOURCE
ENDEXEC
EXEC SQL
   DECLARE C1 CURSOR FOR SELECT*FROM MYSOURCE
ENDEXEC
LOAD DATA
  INCURSOR(C1)
  REPLACE
  INTO TABLE MYTARGET

The present invention also has preferred embodiments capable of performing data transfer in several parallel streams, i.e., in a pipeline mode.

EXAMPLE 2

This example shows the way to load data into several partitions of MYTARGET table in parallel, with the data obtained as results of the SELECT statements, as declared for each partition cursor C1-C4. The LOAD command is executed to fetch data in four parallel streams (pipeline mode), pointed to by the partition cursors C1-C4.

EXEC SQL
   DECLARE C1 CURSOR FOR SELECT*FROM MYSOURCE
   WHERE EMPNO<='099999'
ENDEXEC
EXEC SQL
   DECLARE C2 CURSOR FOR SELECT*FROM MYSOURCE
   WHERE EMPNO>'099999' AND EMPNO<='199999'
ENDEXEC
EXEC SQL
   DECLARE C3 CURSOR FOR SELECT*FROM MYSOURCE
   WHERE EMPNO>'199999' AND EMPNO<='299999'
ENDEXEC
EXEC SQL
   DECLARE C4 CURSOR FOR SELECT*FROM MYSOURCE
   WHERE EMPNO>'299999' AND EMPNO<='999999'
ENDEXEC
LOAD DATA
  INTO TABLE MYTARGET PART 1 REPLACE INCURSOR(C1)
  INTO TABLE MYTARGET PART 2 REPLACE INCURSOR(C2)
  INTO TABLE MYTARGET PART 3 REPLACE INCURSOR(C3)
  INTO TABLE MYTARGET PART 4 REPLACE INCURSOR(C4)

The present invention preferably handles interactions between distributed databases via the DRDA, which can simplify the development task when programmers need to access data stored in multiple DBMSs of the DBMS family 108. The DRDA provides a common SQL API, location transparency, and (in some cases) functional compensation. In addition, multi-database joins and unions can be performed without manually connecting to each data source, retrieving necessary data individually from each source, temporarily storing these data in some application-managed data structure, and coding the necessary logic to handle the data integration associated with a join or union operation. Such work is handled automatically by the multi-database software server, which presents a single-site image of the data that may be physically distributed and stored in disparate DBMSs.

The preferred embodiments of the present invention eliminate the need for a physical consolidation of data from different sources, thus avoiding the software and labor costs involved, as well as the logical exposures introduced due to data latency problems. They also relieve programmers of the burden of writing the software needed to individually connect to each of the necessary data sources, read in any necessary data, correlate (or join) the results read in from multiple data sources, perform any necessary data translations, etc. This is a substantial amount of work which is well beyond the skill level of many programmers, and incurs a great deal of cost. Moreover, the programmers do not have to possess detailed knowledge about the differences between the different data sources.

The present invention preferably uses data formats according to the DRDA protocol, and transfers data via TCP/IP database connection communication line with gigabit Ethernet. It may be used to load from a local or remote target table. It is especially useful for regular automatic refresh (download) of large amount of data from a host computer (source site) warehouse (CC or Visual Warehouse), due to its high speed, reliability, efficiency and flexibility of the present invention. It can also be used with DBMSs other than DB2, such as DL/I or VSAM. The present invention may be used with DBMS supported with different operating systems, such as OS/390, UNIX, Windows, OS/2, etc. It supports DDL and DML execution within utilities, such as CREATE/DROP tables, GRANTs, INSERT/UPDATE/DELETE, etc., without the use of DSNTIAD.

The preferred embodiments of the present invention can support several data type conversions, performed by the data conversion module 122, such as numeric, ASCII/EBCDIC/Unicode, Codepage, etc., and block fetch, and have no problems of file size limitations, or row and field overhead. They simplify the design, development, and maintenance of applications, and provide more reliable applications with a function that is presently not possible.

The foregoing description of the preferred embodiments of the present invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for loading data from a remote data source record by record, in a computer system network connecting a source site and a target site via a database connection communication line, the method comprising the following steps:
   (a) coupling the source site to at least one data source and to a software server having multi-database access to DBMSs;
   (b) at the target site requesting data loading from the source site via a block of Structured Query Language (SQL) statements; and
   (c) transporting data record by record via the database connection communication line according to a multi-database access communication protocol, wherein the target site loading records concurrently with the unloading of records in the source site.

2. The method according to claim 1, wherein a data record is transported across the database connection communication line as soon as one or more data records are unloaded from the source site, and data loading at the target site beginning as soon as a record was transported to the target site.

3. The method according to claim 1, wherein the data loading is performed in a pipeline manner, loading data records in multiple partitions with a plurality of parallel streams, pointed to by a plurality of data source partition cursors.

4. The method according to claim 1, wherein the block of SQL statements comprises dynamic executable SQL statements performing in the EXECUTE IMMEDIATE mode.

5. The method according to claim 1, wherein the block of SQL statements comprises:
   a SQL DECLARE CURSOR FOR SELECT statement, for defining a cursor referencing separately each SELECT statement result record unloading from the server site, and
   a LOAD command and an operator INCURSOR with the cursor name for pointing to the receiving record at the target site.

6. The method according to claim 1, wherein the server site has access to multiple data sources, physically distributed and disparate DBMSs, residing on different hardware systems and possibly storing data in a different format.

7. The method according to claim 6, wherein the server site loads data from multiple data sources, further comprising a step for using a means for consolidating data from multiple data sources.

8. The method according to claim 1, wherein the database connection communication line utilizing the TCP/IP protocol, and the software server has multi-database access to DBMSs including a Distributed Relational Database Architecture(DRDA).

9. A system for loading data from a remote data source record by record, comprising:
   a source site coupled to at least one data source and having a software server with multi-database access to DBMSs;
   a target site requesting data loading from the source site via a block of Structured Query Language (SQL) statements; and
   a database connection communication line for transporting data record by record and according to a multi-database access communication protocol, wherein the target site loading records concurrently with the unloading of records in the source site.

10. The system according to claim 9, wherein a data record is transported across the database connection communication line as soon as one or more data records are unloaded from the source site, and data loading at the target site beginning as soon as a record was transported to the target site.

11. The system according to claim 9, wherein the data loading is performed in a pipeline manner, loading data records in multiple partitions with a plurality of parallel streams, pointed to by a plurality of data source partition cursors.

12. The system according to claim 9, wherein the block of SQL statements comprises dynamic executable SQL statements performing in the EXECUTE IMMEDIATE mode.

13. The system according to claim 9, wherein the block of SQL statements comprises:
   a SQL DECLARE CURSOR FOR SELECT statement, for defining a cursor referencing separately each SELECT statement result record unloading from the server site, and
   a LOAD command and an operator INCURSOR with the cursor name for pointing to the receiving record at the target site.

14. The system according to claim 9, wherein the server site has access to multiple data sources, physically distributed and disparate DBMSs, residing on different hardware systems and possibly storing data in a different format.

15. The system according to claim 14, wherein the server site loads data from multiple data sources, further comprising a means for consolidating data from multiple data sources.

16. The system according to claim 9, wherein the database connection communication line utilizing the TCP/IP protocol, and the software server has multi-database access to DBMSs including a Distributed Relational Database Architecture (DRDA).

17. A program storage device readable by a computer tangibly embodying a program of instructions executable by the computer to perform method steps for loading data from a remote data source record by record, in a computer system network connecting a source site and a target site via a database connection communication line, the method comprising the following steps:

(a) coupling the source site to at least one data source and to a software server having multi-database access to DBMSs;

(b) at the target site requesting data loading from the source site via a block of Structured Query Language (SQL) statements; and (c) transporting data record by record via the database connection communication line according to a multi-database access communication protocol, wherein the target site loading records concurrently with the unloading of records in the source site.

18. The method according to claim 17, wherein a data record is transported across the database connection communication line as soon as one or more data records are unloaded from the source site, and data loading at the target site beginning as soon as a record was transported to the target site.

19. The method according to claim 17, wherein the data loading is performed in a pipeline manner, loading data records in multiple partitions with a plurality of parallel streams, pointed to by a plurality of data source partition cursors.

20. The method according to claim 17, wherein the block of SQL statements comprises dynamic executable SQL statements performing in the EXECUTE IMMEDIATE mode.

21. The method according to claim 17, wherein the block of SQL statements comprises:

a SQL DECLARE CURSOR FOR SELECT statement, for defining a cursor referencing separately each SELECT statement result record unloading from the server site, and a LOAD command and an operator INCURSOR with the cursor name for pointing to the receiving record at the target site.

22. The method according to claim 17, wherein the server site has access to multiple data sources, physically distributed and disparate DBMSs, residing on different hardware systems and possibly storing data in a different format.

23. The method according to claim 22, wherein the server site loads data from multiple data sources, further comprising a step for using a means for consolidating data from multiple data sources.

24. The method according to claim 17, wherein the database connection communication line utilizing the TCP/IP protocol, and the software server has multi-database access to DBMSs including a Distributed Relational Database Architecture (DRDA).

* * * * *